United States Patent [19]

Nakata et al.

[11] Patent Number: 4,539,261
[45] Date of Patent: Sep. 3, 1985

[54] PROCESS FOR PRODUCING MAGNETIC POWDER AND PRODUCT

[75] Inventors: Kazuo Nakata; Masatsuyo Maruo; Kiyoshi Asano, all of Moriyama, Japan

[73] Assignee: Ishihara Sangyo Kaisha, Ltd., Osaka, Japan

[21] Appl. No.: 482,225

[22] Filed: Apr. 5, 1983

[30] Foreign Application Priority Data

Sep. 16, 1982 [JP] Japan ................................ 57-161335
Oct. 6, 1982 [JP] Japan ................................ 57-175745
Feb. 10, 1983 [JP] Japan ................................ 58-21282

[51] Int. Cl.$^3$ .............................................. B32B 3/16
[52] U.S. Cl. ..................................... 428/403; 427/127; 427/372.2; 427/377.0; 427/383.3
[58] Field of Search ................. 427/127–132, 427/48, 372.2, 377, 383.3; 428/900, 694, 693, 403

[56] References Cited

U.S. PATENT DOCUMENTS 4,125,474 11/1978 Dezawa et al. ...................... 427/127

*Primary Examiner*—Bernard D. Pianalto
*Attorney, Agent, or Firm*—Cushman, Darby & Cushman

[57] ABSTRACT

A process for producing a magnetic powder which comprises coating the particle surfaces of a magnetic iron oxide with a cobalt compound or a cobalt compound and a ferrous compound and further coating with a compound of at least one metal selected from the group consisting of manganese, vanadium and zinc. There is obtained a magnetic powder having high coercivity and excellent dispersibility in organic binders. This magnetic powder is useful as a material for recording media such as magnetic tapes.

21 Claims, No Drawings

PROCESS FOR PRODUCING MAGNETIC POWDER AND PRODUCT

FIELD OF THE INVENTION

This invention relates to a process for producing a magnetic powder suited for use as a material for recording media such as magnetic tapes, and more particularly it relates to a process for producing such magnetic powder having a high coercivity and excellent dispersibility in many types of organic binders.

DESCRIPTION OF THE PRIOR ART

Demand has recently been made for further improvement in performance of the recording media such as magnetic tapes, and as the magnetic powder used for such recording media, there is required one having a high coercivity and good dispersibility in various organic binders so as to accommodate increasing densification of magnetic recording. To the demand for a high-coercivity magnetic powder, recently the use of cobalt-containing magnetic iron oxide powder has been increasing, which is composed of $\gamma$-$Fe_2O_3$ particles coated thereon with a cobalt-containing iron oxide layer. Such cobalt-containing magnetic iron oxide powder, however, still has some serious and unsolved problems. For instance, such powder, although improved in coercivity, is found to be poor in wettability to a binder when a magnetic coating material is prepared by mixing such powder with various types of organic binders. Also, because such powder has magnetism per se, there would take place magnetic agglomeration of powder particles, resulting in non-uniform dispersion of the powder particles in the binder, poor stability of coercivity and other undesirable matters.

As measures for improving dispersibility, the following methods have been proposed: (1) The particle agglomerates are broken up by using a mechanical dispersing means (Japanese Patent Laid-Open Nos. 22297/75, 157216/80 and 10903/81). This method is liable to impair the magnetic properties of the powder because of possible damage to acicular particles. Also, since agglomeration begins again upon the cessation of dispersion operation, this method is not sufficient to improve the affinity of powder to a binder. (2) Particle surfaces are covered with a surfactant or the like as a dispersant before the preparation of a coating material for bettering the affinity of the magnetic powder particle surfaces to an organic binder (Japanese Patent Publication No. 19120/78, Japanese Patent Laid-Open Nos. 37297/79, 141196/78, 82354/79 and 85397/79). (3) An organic dispersant is added in the course of the preparation of a coating material (Japanese Patent Laid-Open Nos. 151068/80 and 151069/80). In the case of the methods (2) and (3), the dispersant adsorbed on the magnetic powder particle surfaces might be released during mixing with the organic binder to make it unable to retain the desired dispersing effect. Such dispersant release could take place even after the tape formation, causing a reduction of the magnetic coating strength, or fall-off of powder. Especially the treatment with an organic dispersant is accompanied with the problem of resin selection, that is, although the treatment may improve the dispersibility of particles in vinyl acetate-vinyl chloride type resins, little improvement is made in the dispersibility in urethane resins. Furthermore, a reaction between the functional groups of the dispersant and those of the binder may occur to adversely affect the formation of the coating material.

On the other hand, various techniques using Mn, V and Zn have been proposed for the manufacture of cobalt-containing magnetic iron oxides. For instance, the following methods are known: (1) Both cobalt and manganese, vanadium or zinc are precipitated as metals by means of reduction on the surfaces of the magnetic iron oxide particles (Japanese Patent Laid-Open Nos. 76097/73 and 87397/73). (2) The surfaces of magnetic iron oxide particles are coated with the metal coprecipitates of cobalt and manganese or zinc and then subjected to a heat treatment at a temperature above 200° C. or a hydrothermal treatment (Japanese Patent Publication 23039/76, Japanese Patent Laid-Open Nos. 20098/73, 119997/75, 35696/76, 35697/76, 38097/76, 38098/76, 38099/76, 70498/76, 96097/76 and 96098/76). (3) An acicular magnetic iron oxide powder is heated in a wet state with cobalt ions, Mn ions, $Fe^{+2}$ ions and an alkali at a temperature from 60° C. to the boiling point (Japanese Patent Laid-Open No. 132799/78). (4) An aqueous solution containing cobalt and iron is added to a suspension of magnetic iron oxide powder and the mixed solution is subjected to a wet heating treatment in the presence of an oxidizing agent such as manganese nitrate, zinc nitrate and the like at a temperature above 80° C. (Japanese Patent Laid-Open No. 5498/77). (5) When the magnetic iron oxide powder is coated with the metal coprecipitates of cobalt and Mn, an alkali is added in two portions: one portion before the addition of said metal salts and the other portion after said addition (Japanese Patent Laid-Open No. 5494/77). (6) The magnetic iron oxide powder is immersed in an aqueous solution of a zinc compound such as zinc chloride, zinc oxide, etc., and ammonium chloride while inhibiting the formation of zinc hydroxide (Japanese Patent Laid-Open No. 9671/80).

Nevertheless, any of these proposed techniques has some demerit or other. Method (1), though capable of improving coercivity and reducing electric resistance, can not provide an improvement in dispersibility of particles. Methods (2) to (5), though providing stability or improvements of the magnetic properties of the powder such as inhibition of demagnetization under pressure or under heating, are ineffective for improving the dispersibility. Method (6) can improve the dispersibility but not to a satisfactory degree. Also, a cetain improvement of coercivity is provided by Japanese Patent Laid-Open No. 96098/76 in said method (2), but the degree of such improvement is unsatisfactory.

The present inventors have pursued further studies for overcoming these defects of the prior art techniques, and as a result, found that by first coating magnetic iron oxide particle surfaces with a cobalt compound or with a cobalt compound and a ferrous compound and then further coating said surface with a manganese compound, a vanadium compound or a zinc compound, (a) there can be obtained a magnetic powder of high coercivity even if the coated amount of a cobalt compound, or of a cobalt compound and a ferrous compound is decreased, (b) the dispersibility of the magnetic powder is improved, and further (c) stability of coercivity under storage and under other use conditions is improved, as the coated amount of a cobalt compound and/or a ferrous compound can be reduced, and this invention was completed on the basis of these findings.

SUMMARY OF THE INVENTION

This invention provides a process for producing a magnetic powder characterized in that the particle surfaces of a magnetic iron oxide are first coated with a cobalt compound or with a cobalt compound and a ferrous compound and then further coated with a compound of at least one metal selected from the group consisting of manganese, vanadium and zinc.

DETAILED DESCRIPTION OF PREFERRED EMBODIMENTS

Magnetic iron oxide powders used in the process of this invention may include typically $\gamma$-$Fe_2O_3$ powder, $Fe_3O_4$ powder, powder of a berthollide compound obtained by partially reducing $\gamma$-$Fe_2O_3$ in a suitable manner, for example, by treating $\gamma$-$Fe_2O_3$ powder in a reducing gas such as hydrogen, and powder of $\gamma$-$Fe_2O_3$ modified with ferrous hydroxide. Among them, the $\gamma$-$Fe_2O_3$ powder is most preferred.

In the process of this invention, the particle surfaces of a magnetic iron oxide powder are first coated with a cobalt compound or with a cobalt compound and a ferrous compound. Such coating may be effectuated by various methods such as mentioned below. (1) The magnetic iron oxide powder is dispersed in water or an aqueous alkali solution, and to this dispersion is added a cobalt salt, or a cobalt salt and a ferrous salt, followed by addition, if necessary, of an aqueous alkali solution. (2) Said powder is dispersed in water, followed by simultaneous addition of an aqueous alkali solution and of a cobalt salt or a cobalt salt and a ferrous salt. (3) Said powder is dispersed in a cobalt salt or a cobalt salt and a ferrous salt, and this dispersion is added dropwise into an aqueous alkali solution. (4) Said powder is dispersed in water or an aqueous alkali solution, followed by successive additions of (a) a cobalt salt, if necessary an aqueous alkali solution, a ferrous salt and if necessary an aqueous alkali solution in that order, or (b) a ferrous salt, if necessary an aqueous alkali solution, a cobalt salt and if necessary an aqueous alkali solution in that order. (5) A coating suspension is prepared outside of the system by adding a cobalt salt to a ferrous compound obtained by neutralizing a ferrous salt with an aqueous alkali solution, and this suspension is added to a slurry formed by dispersing said magnetic powder in an aqueous alkali solution.

The cobalt salts used in the process of this invention include both inorganic and organic acid salts of cobalt such as cobalt sulfate, cobalt chloride and cobalt acetate. Examples of the ferrous salts used in this invention are ferrous sulfate and ferrous chloride. As the alkali, one may use, for example, sodium hydroxide, potassium hydroxide, calcium hydroxide, sodium carbonate and potassium carbonate.

The coated amount of the cobalt compound or ferrous compound formed from a reaction of a cobalt salt or ferrous salt and an alkali is, in the case of the former (cobalt compound), 0.1 to 20% by weight, preferably 0.5 to 10% by weight, calculated in terms of Co and, in the case of the latter (ferrous compound), 0.2 to 30% by weight, preferably 1 to 20% by weight calculated in terms of Fe, all based on the total amount (weight) of Fe in the magnetic iron oxide powder. Other compounds of manganese, vanadium, zinc, nickel, chromium, or etc., may be allowed to exist in slight quantities in the coating.

In the process of this invention, the reaction temperature during the coating operation is usually below the boiling point, preferably from 10° to 60° C. The atmosphere in which coating is to be made is preferably non-oxidizing, since the oxidation of the cobalt compound and ferrous compound used should be avoided. For this purpose, it is suggested to replace an atmosphere in a reactor with an inert gas or to allow an inert gas to bubble through a solution in a reactor. Time required to add the materials in the coating work varies depending on the coating methods, coating conditions such as molar concentration of OH groups in the reaction solution, and coating reaction temperatures, etc., but it is usually more than 5 minutes, preferably 10 minutes to 3 hours.

The slurry of the magnetic iron oxide powder which has gone through coating of a cobalt compound or a cobalt compound and a ferrous compound is then usually subjected to aging. The term "aging" is herein used to refer to an operation in which the coated slurry is allowed to stand under stirring or without stirring. In this invention, this aging is usually conducted at a temperature below the boiling point, preferably from 10° to 60° C., and in an alkali concentration range from an around neutral pH value to up to about 3 mol/l, preferably up to 2 mol/l of free OH group concentration. The aging atmosphere also is preferably non-oxidizing as in the case of the coating operation described above.

Next, to the slurry under or after aging, or a slurry formed by dispersing in water the wet cakes obtained by filtering and washing with water the slurry under or after aging, there is added a water-soluble compound of at least one metal selected from Mn, V and Zn to coat the magnetic iron oxide powder with a compound of said metal. Such coating of a metal (Mn, V or Zn) compound may be made in the following way, for instance. To the slurry of the magnetic iron oxide powder which has undergone coating of a cobalt compound (or a cobalt compound and a ferrous compound) and which is under or after aging, there is added an aqueous solution of a compound which is capable of producing an Mn, V or Zn metal compound by a reaction with an alkali, and said metal compound is coated on the particle surfaces of said powder. In this case, it proves effective for attaining uniform coating of said metal compound to conduct the reaction with an alkali in such a manner that the reaction advances as slowly as possible. The pH value and free OH group concentration of the slurry and the adding rate of said aqueous solution can be properly adjusted to suit the situation. Coating of said metal compound may be conducted either immediately after coating of a cobalt compound (and/or a ferrous compound) or after aging for up to about 30 hours, but it is usually preferred to make said metal compound coating after aging for 10 minutes to 20 hours. The temperature at which said coating is made is usually below the boiling point, preferably from 10° to 60° C. This coating is preferably carried out in an alkali concentration range of from an around neutral pH value to up to about 3 mol/l, preferably up to 2 mol/l of free OH group concentration. A non-oxidizing atmosphere should be used for this coating operation. The amount of the compound of at least one metal selected from Mn, V and Zn to be coated is usually 0.1 to 10, preferably 0.5 to 5 parts by weight for Mn, 0.05 to 5, preferably 0.1 to 2 parts by weight for V and 0.1 to 10, preferably 0.5 to 5 parts by weight for Zn, per 100 parts by weight of the magnetic iron oxide powder.

If the coated amount of said metal compound is less than the above-defined ranges, no desired effect is provided, while a too much coated amount, although allowing retention of the dispersibility improving effect, will tend to cause a reduction of specific saturation magnetization (oS) or an increase in the switching field distribution.

As the water-soluble compound of said metal to be added to the slurry, there may be used manganese sulfate, manganese chloride, metavanadates, vanadium oxysulfate, zinc sulfate, zinc chloride, zincic acid, zincates and the like.

The slurry coated with a compound of Mn, V or Zn is aged at a temperature usually below the boiling point, preferably from 10° to 60° C., for a period of 30 minutes to 10 hours under preferably a non-oxidizing atmosphere.

The thus treated slurry is usually filtered, washed with water and dried, if necessary, followed by a heat treatment such as mentioned below, to thereby obtain the magnetic powder of this invention. In case no heat treatment is applied, the reaction temperature and free OH group concentration should properly be selected, for example, a temperature is above 60° C and an OH group concentration above 0.1 mol/1, during coating of said Mn, V or Zn compound and during aging. In the process of this invention, it is preferred to conduct a heat treatment after coating of said Mn, V or Zn compound. Such various methods as mentioned below are available for effecting such heat treatment. (1) A slurry of the coated particles is subjected to a wet heat treatment in an autoclave at a temperature of 100° to 250° C., preferably 100° to 200° C. (2) The slurry is filtered and washed with water to form wet cakes and these wet cakes are again dispersed in water to form a slurry, which is then subjected to a wet heat treatment in an autoclave at 100° to 250° C., preferably 100° to 200° C. (3) Said wet cakes are subjected to a heat treatment in the presence of water vapor at a temperature of 60° to 250° C., preferably 60° to 200° C. (4) Said wet cakes are subjected to a dry heat treatment at a temperature of 100° to 300° C., preferably 100° to 200° C. The heat treatment in the presence of water vapor referred to herein includes a treatment conducted under heating in the presence of water vapor in a sealed vessel such as an autoclave or a tube furnace with water vapor flown therethrough ($N_2$ gas purging) as well as a treatment in which after drying at a low temperature, heated water vapor is introduced into a fluidized bed and contacted with the cakes. It is also possible to employ a highspeed fluid energy mill to accomplish the pertinent treatment with simultaneous pulverization of the material.

The cobalt-containing magnetic iron oxide powder obtained according to the process of this invention is improved not only in coercivity but also in various magnetic properties such as stability of coercivity under storage and other use conditions and, accordingly, the magnetic tapes made by using such powder are markedly improved in various magnetic properties such as squareness, orientability, etc., in addition to the improvements in coercivity and stability thereof under storage and other use conditions. In the case of using an Mn compound in the process of this invention, it is possible to reduce the magnetic tape transability of infrared rays, so that the invention is of much utility in applications requiring such peculiarity. Furthermore, this invention is possible to practice in a wider scope of use and thus can contribute greatly to the industries concerned.

EXAMPLES 1-5

100 g of $\gamma$-$Fe_2O_3$ (coercivity Hc: 411 Oe; BET specific surface area: 26 $m^2/g$) was dispersed in 1 liter of water to form a slurry, and to this slurry were added 63 ml of an aqueous 0.85 mol/1 solution of cobalt sulfate and 98 ml of an aqueous 0.90 mol/1 solution of ferrous sulfate while blowing $N_2$ gas into the solution at 40° C., and then an aqueous 5 mol/1 solution of NaOH was added to the mixed solution to coat the particle surfaces of $\gamma$-$Fe_2O_3$ with the cobalt compound and ferrous compound. Thereafter, the slurry was aged under stirring at 40° C. for 3 hours. (The pH value of the slurry was 8.5).

To the thus obtained slurry, while maintained at 40° C., was added an aqueous solution containing manganese sulfate in an amount selected to provide the Mn content shown in Table 1 and an aqueous NaOH solution of an amount slightly in excess of the equivalent of said salt to thereby make coating of the manganese compound. This was followed by one-hour stirring at 40° C. (The pH value of the slurry after this treatment was 10.5).

Each of the thus prepared slurries was filtered and washed with water to form wet cakes, which were then put into an autoclave together with water kept in a separate container, and after replacing the autoclave atmosphere with $N_2$ gas, the autoclave was sealed and subjected to a heat treatment in the presence of water vapor at 130° C. for 6 hours. This treatment was followed by drying in $N_2$ gas at 120° C. to obtain intended magnetic powder samples A-1 to A-5.

COMPARATIVE EXAMPLE 1

A magnetic powder sample B was obtained in accordance with the same procedures as in Example 1, except that no manganese compound was coated.

The coercivity (Hc) and specific saturation magnetization (oS) of each of the above samples A-1-A-5 and B were measured in the usual way. The results are shown in Table 1.

Then, a blend was prepared by using each of the above samples according to either urethane formulation or vinyl formulation shown below, and each blend was treated in a ball mill to produce a magnetic coating material. Each of the thus produced magnetic coating materials was applied on a polyester film, orientated and dried in the ordinary way to make a magnetic tape having an approximately 9-micron thick magnetic coating, and each of the thus obtained magnetic tapes was subjected to the measurements of coercivity (Hc), squareness (Br/Bm) and orientability (OR) by the known methods. The results are shown in Table 1.

Both squareness and orientability serve as an index for dispersibility; the higher the measured values of these properties, the better the dispersibility is.

| Urethane formulation | | |
|---|---|---|
| (1) Magnetic powder | 24 | parts by weight |
| (2) Polyurethane resin | 5 | " |
| (3) Vinyl chloride-vinyl acetate copolymer | 1.2 | " |
| (4) Dispersant | 0.5 | " |
| (5) Mixed solvent (toluene/MEK/ cyclohexane = 3/3/1) | 69.3 | " |
| Vinyl formulation | | |
| (1) Magnetic powder | 25 | parts by weight |

-continued

| | | |
|---|---|---|
| (2) Vinyl chloride-vinyl acetate-vinyl alcohol copolymer | 5.2 | " |
| (3) DOP (dioctyl phthalate) | 1.1 | " |
| (4) Dispersant | 0.5 | " |
| (5) Mixed solvent (toluene/MEK = 1/1) | 68.2 | " |

TABLE 1

| | | Mn content (wt. %) | Magnetic properties of powder | | Measurements of tapes from urethane formulation | | | Measurements of tapes from vinyl formulation | | |
|---|---|---|---|---|---|---|---|---|---|---|
| | Samples | | Hc (Oe) | oS (emu/g) | Hc (Oe) | Br/Bm | OR | Hc (Oe) | Br/Bm | OR |
| Example 1 | A-1 | 1 | 583 | 76.4 | 593 | 0.820 | 2.22 | 598 | 0.851 | 2.37 |
| Example 2 | A-2 | 2 | 629 | 75.9 | 645 | 0.828 | 2.24 | 653 | 0.853 | 2.39 |
| Example 3 | A-3 | 3 | 651 | 75.1 | 673 | 0.837 | 2.35 | 675 | 0.853 | 2.40 |
| Example 4 | A-4 | 4 | 669 | 74.7 | 693 | 0.829 | 2.32 | 703 | 0.851 | 2.39 |
| Example 5 | A-5 | 5 | 684 | 74.5 | 708 | 0.828 | 2.24 | 715 | 0.854 | 2.41 |
| Comp. Example 1 | B | 0 | 543 | 76.5 | 540 | 0.792 | 1.91 | 543 | 0.814 | 2.04 |

EXAMPLES 6-8

100 g of $\gamma$-Fe$_2$O$_3$ (coercivity Hc: 379 Oe; BET specific surface area: 33 m$^2$/g) was dispersed in 1 liter of water to form a slurry, to which was then added 70 ml of an aqueous 0.85 mol/1 solution of cobalt sulfate and 140 ml of an aqueous 0.90 mol/1 solution of ferrous sulfate while blowing N$_2$ gas into the solution at 30° C. The mixed solution was stirred and further added with an aqueous 10 mol/1 solution of NaOH to coat the particle surfaces of $\gamma$-Fe$_2$O$_3$ with the cobalt compound and ferrous compound. Thereafter, the slurry was aged at 30° C. under stirring for the periods shown in Table 2. (The free OH group concentration of the slurry after this treatment was 1 mol/1).

To each of the thus obtained slurries, while maintained at 30° C., was added 70 ml of an aqueous 0.55 mol/1 solution of manganese sulfate to make coating of the manganese compound, followed by 3-hour stirring at 30° C.

The thus prepared slurries were filtered and washed with water to form the wet cakes, which were then treated in the same way as in Example 1 to obtain intended magnetic powder samples C-1 to C-3.

COMPARATIVE EXAMPLE 2

The process of Example 7 was repeated, except that no manganese compound coating was made to obtain a magnetic powder sample D.

COMPARATIVE EXAMPLE 3

100 g of $\gamma$-Fe$_2$O$_3$ used in Example 6 was dispersed in 1 liter of water to form a slurry, to which was then added a mixed solution consisting of 70 ml of an aqueous 0.85 mol/1 cobalt sulfate solution, 140 ml of an aqueous 0.90 mol/1 ferrous sulfate solution and 70 ml of an aqueous 0.55 mol/1 manganese sulfate solution while blowing N$_2$ gas into the solution at 30° C. The whole mixed solution was stirred, to which was further added an aqueous 10 mol/1 solution of NaOH to make coating of the cobalt compound, ferrous compound and manganese compound on the particle surfaces of $\gamma$-Fe$_2$O$_3$. The slurry was then aged under stirring at 30° C. for 3 hours. (The free OH group concentration of the slurry after this treatment was 1 mol/1).

This slurry was then filtered and washed with water to form the wet cakes, which were treated in the same manner as in Example 1 to obtain a magnetic powder sample E.

The coercivity (Hc) and specific saturation magnetization (oS) of each of the above samples C-1–C-3, D and E were measured in the usual way. The results are shown in Table 2.

Furthermore, the magnetic tapes were produced by using said respective samples in the same manner as described above, and their coercivity (Hc), squareness (Br/Bm) and orientability (OR) were measured by the ordinary methods. The obtained results are shown in Table 2.

TABLE 2

| | Samples | Aging time after Co coating (hr) | Magnetic properties of powder | | Measurements of tapes from urethane formulation | | | Measurements of tapes from vinyl formulation | | |
|---|---|---|---|---|---|---|---|---|---|---|
| | | | Hc (Oe) | oS (emu/g) | Hc (Oe) | Br/Bm | OR | Hc (Oe) | Br/Bm | OR |
| Example 6 | C-1 | 3 | 770 | 77.8 | 810 | 0.803 | 2.10 | 819 | 0.821 | 2.12 |
| Example 7 | C-2 | 5 | 760 | 77.6 | 803 | 0.805 | 2.10 | 814 | 0.823 | 2.14 |
| Example 8 | C-3 | 20 | 765 | 77.7 | 806 | 0.811 | 2.12 | 815 | 0.826 | 2.14 |
| Comp. Example 2 | D | 5 | 671 | 78.8 | 682 | 0.764 | 1.68 | 700 | 0.804 | 1.91 |
| Comp. Example 3 | E | — | 715 | 77.1 | 766 | 0.775 | 1.75 | 740 | 0.796 | 1.78 |

EXAMPLE 9

100 g of $\gamma$-Fe$_2$O$_3$ (coercivity Hc: 401 Oe; BET specific surface area: 29 m$^2$/g) was dispersed in 1 liter of water to form a slurry, to which was then added 70 ml of an aqueous 0.85 mol/1 solution of cobalt sulfate and 140 ml of an aqueous 0.90 mol/1 solution of ferrous sulfate while blowing N$_2$ gas into the solution at 30° C. To the mixed solution under stirring was further added an aqueous 10 mol/1 solution of NaOH to coat the particle surfaces of $\gamma$-$Fe_2O_3$ with the cobalt compound and ferrous compound. The slurry was then aged under stirring at 30° C. for 5 hours. (Free OH group concentration: 1 mol/1).

The thus prepared slurry was heated to 60° C. and then 47 ml of an aqueous 0.59 mol/1 solution of vanadium oxysulfate was added to said slurry to make coating of the vanadium compound, followed by 2-hour stirring.

This slurry was filtered and washed with water and the obtained wet cakes were put into an autoclave together with water kept in a separate container, and after replacement of the autoclave atmosphere with $N_2$ gas and sealing of the autoclave, the material therein was subjected to a heat treatment at 120° C. in the presence of water vapor for 6 hours and then dried in $N_2$ gas at 120° C. to obtain an intended magnetic powder sample F.

COMPARATIVE EXAMPLE 4

A magnetic powder sample G was obtained in accordance with the same process as Example 9, except that no vanadium compound coating was made.

The coercivity (Hc) and specific saturation magnetization (oS) of said samples F and G were measured in the known ways. The results are shown in Table 3.

Also, magnetic tapes were manufactured by using said respective samples in the same manner as described above, and their coercivity (Hc), squareness (Br/Bm) and orientability (OR) were measured. The results are given in Table 3.

This slurry was filtered and washed with water and the formed wet cakes were treated in the same manner as in Example 1 to obtain an intended magnetic powder sample H.

COMPARATIVE EXAMPLE 5

A magnetic powder sample I was obtained by repeating the process of Example 10, except that no manganese compound was coated.

EXAMPLE 11

100 g of the same $\gamma$-$Fe_2O_3$ as used in Example 10 was dispersed in 1 liter of water to form a slurry, and to this slurry was added 135.2 ml of an aqueous solution of NaOH with $N_2$ gas blown into the solution at 30° C. to make the intra-system atmosphere non-oxidative. In the meantime, 140 ml of an aqueous ferrous sulfate solution (0.90 mol/1 concentration) maintained at 30° C. was added to 38.2 ml of an aqueous 10 mol/1 solution of NaOH in a non-oxidizing atmosphere to produce ferrous hydroxide, and then 63 ml of a 0.85 mol/1 cobalt sulfate solution was added to prepare a suspension containing ferrous hydroxide and cobalt hydroxide. (The free OH group concentration of this suspension was 0.1 mol/1). This suspension was added to said slurry in the non-oxidizing atmosphere to coat the particle surfaces of $\gamma$-$Fe_2O_3$ with the ferrous compound and cobalt compound. This was followed by 3-hour aging under stirring at 30° C. (The free OH group concentration of the solution after this treatment was 1 mol/1).

To the thus obtained slurry, while maintained at 30°

TABLE 3

| | Samples | Magnetic properties of powder | | Measurements of tapes from urethane formulation | | | Measurements of tapes from vinyl formulation | | |
|---|---|---|---|---|---|---|---|---|---|
| | | Hc (Oe) | oS (emu/g) | Hc (Oe) | Br/Bm | OR | Hc (Oe) | Br/Bm | OR |
| Example 9 | F | 665 | 75.6 | 684 | 0.828 | 2.10 | 697 | 0.835 | 2.24 |
| Comp. Example 4 | G | 610 | 75.9 | 620 | 0.779 | 1.81 | 633 | 0.804 | 1.95 |

EXAMPLE 10

100 g of $\gamma$-$Fe_2O_3$ (coercivity Hc: 399 Oe; BET specific surface area: 34 m2/g) was dispersed in 1 liter of water to form a slurry, and to this slurry was added 42.2 ml of an aqueous 10 mol/1 solution of NaOH under stirring while blowing $N_2$ gas into the solution at 30° C., followed by further addition of 168 ml of an aqueous 0.90 mol/1 solution of ferrous sulfate to make coating of the ferrous compound on the particle surfaces of $\gamma$-$Fe_2O_3$. To the slurry was further added 143.5 ml of an aqueous 10 mol/1 solution of NaOH and 70 ml of an aqueous 0.85 mol/1 solution of cobalt sulfate to make cobalt compound coating. Then 3-hour stirring and aging at 30° C. were conducted. (The free OH group concentration after this treatment was about 1.0 mol/1).

To the thus obtained slurry maintained at 30° C. was added 14 ml of an aqueous 0.91 mol/1 solution of manganese sulfate and an aqueous solution of NaOH in an amount of equivalent of the salt to accomplish coating of the manganese compound and then stirred at 30° C. for 2 hours. (The free OH group concentration of the slurry after this treatment was about 1.0 mol/1).

C., was added 14 ml of a 0.91 mol/1 manganese sulfate solution and an NaOH solution in an amount of equivalent of the salt to attain manganese compound coating. The slurry was then stirred at 30° C. for 2 hours (free OH group concentration: 1 mol/1).

This slurry was filtered and washed with water to form wet cakes, which were then treated in the same manner as in the case of Example 1 to obtain an intended magnetic powder sample J.

COMPARATIVE EXAMPLE 6

A magnetic powder sample K was obtained in accordance with the same process as in Example 11, except that no manganese compound coating was made.

The coercivity (Hc) and specific saturation magnetization (oS) of said samples H–K were measured in the known ways. The results are shown in Table 4.

Also, magnetic tapes were produced by using said respective samples in the same manner as described above, and their coercivity (Hc), squareness (Br/Bm) and orientability (OR) were measured by the ordinarily used methods. The results are shown in Table 4.

TABLE 4

| | Samples | Magnetic properties of powder | | Measurements of tapes from urethane formulation | | | Measurements of tapes from vinyl formulation | | |
|---|---|---|---|---|---|---|---|---|---|
| | | Hc (Oe) | oS (emu/g) | Hc (Oe) | Br/Bm | OR | Hc (Oe) | Br/Bm | OR |
| Example 10 | H | 659 | 78.2 | 679 | 0.808 | 1.95 | 671 | 0.804 | 1.84 |
| Comp. Example 5 | I | 648 | 77.9 | 657 | 0.752 | 1.72 | 668 | 0.789 | 1.80 |
| Example 11 | J | 674 | 77.6 | 698 | 0.802 | 1.88 | 699 | 0.806 | 1.88 |
| Comp. Example 6 | K | 657 | 77.0 | 664 | 0.736 | 1.62 | 677 | 0.787 | 1.74 |

EXAMPLE 12

100 g of $\gamma$-$Fe_2O_3$ (coercivity Hc: 399 Oe; BET specific surface area: 34 m$^2$/g) was dissolved in 1 liter of water to form a slurry, and to this slurry were added under stirring 63 ml of a 0.85 mol/1 cobalt sulfate solution and 126 ml of a 0.90 mol/1 ferrous sulfate solution while blowing $N_2$ gas into the solution at 30° C., followed by further addition of a 10 mol/1 NaOH solution to coat the particle surfaces of $\gamma$-$Fe_2O_3$ with the cobalt compound and ferrous compound. The slurry was then aged by stirring at 30° C. for 5 hours. (The free OH group concentration of the slurry was 1.0 mol/1).

To the thus prepared slurry, kept at 30° C., was added 21 ml of a 0.76 mol/1 zinc sulfate solution and an NaOH solution slightly in excess of the equivalent of the salt to achieve coating of the zinc compound. The slurry was then stirred at 30° C. for 2 hours (free OH group concentration: 1.0 mol/1).

This slurry was filtered and washed with water to form wet cakes, which were then put into an autoclave together with water kept in a separate container, and after replacement with $N_2$ gas and sealing of the autoclave, the material therein was subjected to a heat treatment in the presence of water vapor at 130° C. for 6 hours and then dried in $N_2$ gas at 120° C. to obtain an intended magnetic powder sample L-1.

COMPARATIVE EXAMPLE 7

A magnetic powder sample L-2 was obtained by the same treatments as in Example 12, except that no coating of the zinc compound was made.

COMPARATIVE EXAMPLE 8

100 g of the same $\gamma$-$Fe_2O_3$ as used in Example 12 was dispersed in 1 liter of water to form a slurry, and to this slurry was added under stirring a mixed solution composed of 63 ml of a 0.85 mol/1 cobalt sulfate solution, 126 ml of a 0.90 mol/1 ferrous sulfate solution and 21 ml of a 0.76 mol/1 zinc sulfate solution while blowing $N_2$ gas into the solution at 30° C., and then a 10 mol/1 NaOH solution was further added, thereby coating the particle surfaces of $\gamma$-$Fe_2O_3$ with the cobalt compound, ferrous compound and zinc compound. The slurry was then aged under stirring at 30° C. for 5 hours (free OH group concentration: 1 mol/1).

This slurry was filtered and washed with water to form wet cakes, which were then treated in the same manner as in Example 12 to obtain a magnetic powder sample L-3.

COMPARATIVE EXAMPLE 9

The slurry which has undergone the treatment to coat both cobalt and ferrous compounds on the particle surfaces of $\gamma$-$Fe_2O_3$ and then age after the manner of Example 12 as described above, was filtered and washed with water to form wet cakes, which were then put into an autoclave together with water kept in a separate container, and after replacement of the autoclave atmosphere with $N_2$ gas and sealing of the autoclave, the material contained therein was heat treated in the presence of water vapor at 130° C. for 6 hours. 75 g of this treated material was added into 500 ml of a zinc chloride-ammonium chloride solution formed by dissolving 1 g of zinc chloride and 5 g of ammonium chloride in water and was kept immersed overnight at room temperature while stirring the solution by a homomixer. After this immersion, the material was filtered, washed with water and dried in $N_2$ gas at 120° C. for 6 hours to obtain a magnetic powder sample L-4.

The coercivity (Hc) and specific saturation magnetization (oS) of each of said samples L-1–L-4 were measured in the usual ways. The results are shown in Table 5.

Furthermore, magnetic tapes were manufactured by using these samples in the manner as explained above and the coercivity (Hc), squareness (Br/Bm) and orientability (OR) of such tapes were measured by the known methods. The results are shown in Table 5.

TABLE 5

| | Samples | Magnetic properties of powder | | Measurements of tapes from urethane formulation | | |
|---|---|---|---|---|---|---|
| | | Hc (Oe) | os (emu/g) | Hc (Oe) | Br/Bm | OR |
| Example 12 | L-1 | 632 | 77.0 | 660 | 0.769 | 1.77 |
| Comp. Example 7 | L-2 | 588 | 76.6 | 618 | 0.720 | 1.50 |
| Comp. Example 8 | L-3 | 585 | 77.5 | 602 | 0.763 | 1.67 |
| Comp. Example 9 | L-4 | 627 | 76.7 | 642 | 0.746 | 1.66 |

EXAMPLE 13

An intended magnetic powder sample M-1 was obtained in accordance with the same process as in Example 10, except that 14 ml of a 0.76 mol/1 zinc sulfate solution was added instead of the manganese sulfate solution to provide zinc compound coating.

COMPARATIVE EXAMPLE 10

A magnetic powder sample M-2 was obtained in accordance with the same process as in Example 13, except that no zinc compound coating was made.

EXAMPLE 14

An intended magnetic powder sample N-1 was obtained in the same way as in Example 11, except that 14 ml of a 0.76 mol/1 zinc sulfate solution was added instead of the manganese sulfate solution to give zinc compound coating.

COMPARATIVE EXAMPLE 11

A magnetic powder sample N-2 was obtained in accordance with the same process as in Example 14, except that no zinc compound coating was made.

By using said respective samples M-1, M-2, N-1 and N-2, the magnetic tapes were produced in the same way as described above, and the squareness (Br/Bm) and orientability (OR) of such tapes were measured in the usual ways. The results are shown in Table 6.

TABLE 6

| | Samples | Measurements of tapes from urethane formulation | |
|---|---|---|---|
| | | Br/Bm | OR |
| Example 13 | M-1 | 0.79 | 1.86 |
| Comp. Example 10 | M-2 | 0.75 | 1.72 |
| Example 14 | N-1 | 0.79 | 1.85 |
| Comp. Example 11 | N-2 | 0.74 | 1.62 |

EXAMPLE 15

200 g of acicular $\gamma$-$Fe_2O_3$ (coercivity Hc: 405 Oe; BET specific surface area: 31 m²/g) was dispersed in water to form a slurry having a concentration of 100 g/l, and to this slurry was added an aqueous mixed solution of cobalt sulfate and ferrous sulfate while blowing $N_2$ gas into the solution, followed by dropwise addition of an NaOH solution and stirring of the whole slurry at 30° C. for 5 hours to make coating of both cobalt and ferrous compounds on the $\gamma$-$Fe_2O_3$ particle surfaces. The coated amounts of said both compounds were 5% by weight calculated in terms of Co and 10% by weight calculated in terms of Fe, respectively, based on the total weight of iron in $\gamma$-$Fe_2O_3$.

This slurry was filtered and washed with water to make wet cakes and the latter were again dispersed in water to form a 150 g/l slurry and heated to 60° C. while blowing $N_2$ gas into the slurry. Then an NaOH solution and a vanadium oxysulfate solution, both maintained at pH 7.5, were added dropwise under stirring for a period of one hour while blowing $N_2$ gas into the solution, followed by one-hour stirring and aging to coat the vanadium compound on the particle surfaces. The coated amount was 0.8% by weight calculated as V based on the cobalt-containing magnetic iron oxide powder. Then the slurry was filtered and washed with water and the obtained wet cakes were put into an autoclave together with water kept in a separate container, and after $N_2$ replacement and sealing of the autoclave, the material therein was subjected to a heat treatment in the presence of water vapor at 130° C. for 6 hours and then dried at 60° C. for 8 hours to obtain an intended magnetic powder sample 0.

EXAMPLE 16

An intended magnetic powder sample P was obtained in accordance with the same treatments as in Example 15, except that the wet cakes were subjected to a dry heat treatment at 120° C. in an $N_2$ atmosphere for 4 hours instead of heating in the presence of water vapor.

EXAMPLE 17

An intended magnetic powder sample Q was obtained in accordance with the same process as in Example 15, except that a manganese sulfate solution, maintained at pH 8.5, was added dropwise for a period of one hour instead of the vanadium oxysulfate, and then the slurry was stirred and aged for one hour to coat 2.0% by weight of the manganese compound in terms of Mn, based on the weight of the cobalt-containing magnetic iron oxide powder.

EXAMPLE 18

An intended magnetic powder sample R was obtained in accordance with the same process as in Example 15, except that a zinc sulfate solution is used instead of the vanadium oxysulfate solution, said solution is added dropwise for a period of one hour while maintaining its pH at 8.5, and the slurry is aged under stirring for one hour to coat 2.0% by weight of the zinc compound in terms of Zn, based on the weight of the cobalt-containing magnetic iron oxide powder.

COMPARATIVE EXAMPLE 12

A magnetic powder sample S was obtained in accordance with the same process as in Example 15, except that no vanadium compound coating was made.

The coercivity (Hc) and specific saturation magnetization (oS) of said respective samples 0 to S were measured in the usual ways. Also, the thermal stability (Tp) of coercivity was determined from the following formula:

$$\text{Thermal stability } (Tp) = \frac{Hc \text{ of powder at } 125° C.}{Hc \text{ of powder at room temp.}} \times 100$$

(This shows that the closer to 1 is Tp, the better is the thermal stability of magnetism). The results are shown in Table 7.

By using said respective samples, there were produced the magnetic coating materials according to the following urethane formulation:

| Urethane formulation | | |
|---|---|---|
| (1) Magnetic powder | 24 | parts by weight |
| (2) Polyurethane resin | 5 | " |
| (3) Vinyl chloride-vinyl acetate copolymer | 1.2 | " |
| (4) Dispersant (Phosphoric acid ester type compound) | 0.5 | " |
| (5) Mixed solvent (toluene/MEK = 1/1) | 69.3 | " |

Magnetic coating materials were also produced with the respective samples O, Q, R and S according to the following vinyl formulation:

| Vinyl formulation | | |
|---|---|---|
| (1) Magnetic powder | 30 | parts by weight |
| (2) Vinyl chloride-vinyl acetate-vinyl alcohol copolymer | 4.5 | " |
| (3) DOP (dioctyl phthalate) | 1.3 | " |
| (4) Dispersant (phosphoric acid ester type compound) | 0.6 | " |
| (5) Mixed solvent (toluene/MEK = 1/1) | 63.6 | " |

Then, each of the thus produced magnetic coating materials was applied on a polyester film, orientated and dried, all in the usual ways, to make a magnetic tape having an approximately 9-micron thick magnetic coating, and the coercivity (Hc), squareness (Br/Bm) and orientability (OR) of each of the thus made magnetic tapes were measured. The results of the measurements on the tapes from urethane formulation are shown in Table 7 and those on the tapes from vinyl formulation are shown in Table 8.

TABLE 7

| Samples | | Powder properties | | | Tape properties | | |
|---|---|---|---|---|---|---|---|
| | | Hc (Oe) | σs (emu/g) | Tp (%) | Hc (Oe) | Br/Bm | OR |
| Example 15 | O | 667 | 76.7 | 75 | 710 | 0.86 | 2.5 |
| Example 16 | P | 640 | 77.3 | 74 | 670 | 0.83 | 2.2 |
| Example 17 | Q | 693 | 76.6 | 74 | 712 | " | " |
| Example 18 | R | 657 | 76.7 | 75 | 677 | 0.82 | 2.1 |
| Comp. Example 12 | S | 605 | 77.6 | 74 | 626 | 0.76 | 1.7 |

TABLE 8

| Samples | | Tape properties | | |
|---|---|---|---|---|
| | | Hc (Oe) | Br/Bm | OR |
| Example 15 | O | 708 | 0.86 | 2.5 |
| Example 17 | Q | 710 | 0.84 | 2.3 |
| Example 18 | R | 682 | 0.84 | 2.2 |
| Comp. Example 12 | S | 632 | 0.78 | 1.8 |

As is apparent from the foregoing description, the magnetic powder samples according to this invention are higher in squareness (Br/Bm) and orientability (OR) than those of the comparative examples, and this tendency is also seen in the magnetic coating materials prepared by using said powder samples with different binder compositions, indicating a marked improvement in dispersibility of the magnetic powder of this invention.

It will be also understood that the magnetic powder of this invention is greatly improved in coercivity (Hc) both in the powder form and in its adaptation to the magnetic tapes. Usually, when coercivity is elevated, the thermal stability (Tp) of coercivity is excessively deteriorated to badly affect the stability properties, but the magnetic powder of this invention, which is appreciably improved in coercivity as said above, still maintains the excellent magnetic properties, with its thermal stability (Tp) being substantially identical with those of the comparative examples.

What is claimed is:

1. A process for producing a magnetic powder which comprises the two steps of first coating the particle surfaces of a magnetic iron oxide with a cobalt compound or a cobalt compound and a ferrous compound and subsequently coating the cobalt compound or cobalt and ferrous compounds-coated surfaces with a compound of at least one metal selected from the group consisting of manganese, vanadium and zinc under a non-oxidizing atmosphere.

2. The process of claim 1, wherein the coated amount of the cobalt compound is 0.5 to 10% by weight calculated as Co based on the total amount of Fe in said magnetic iron oxide.

3. The process of claim 1, wherein the coated amounts of the cobalt compound and the ferrous compound are 0.5 to 10% by weight calculated as Co and 1 to 20% by weight calculated as Fe, respectively, based on the total amount of Fe in said magnetic iron oxide.

4. The process of claim 1, wherein coating of a cobalt compound or a cobalt compound and a ferrous compound is accomplished under a non-oxidizing atmosphere at a temperature of 10° to 60° C.

5. The process of claim 1, wherein coating of a cobalt compound or a cobalt compound and a ferrous compound is accomplished under a non-oxidizing atmosphere at a temperature from 60° C. to the boiling point.

6. The process of claim 1, wherein the slurry of said magnetic iron oxide after coating of a cobalt compound or a cobalt compound and a ferrous compound is aged under a non-oxidizing atmosphere in an alkali concentration range from an around neutral pH value to 2 mol/l of a free OH group concentration and at a temperature of 10° to 60° C.

7. The process of claim 1, wherein in the course of or after aging of the slurry of said magnetic iron oxide which has gone through coating of a cobalt compound or a cobalt compound and a ferrous compound, said slurry is added with a water-soluble compound of at least one metal selected from the group consisting of manganese, vanadium and zinc under a non-oxidizing atmosphere so that said compound is coated on the particle surfaces of said magnetic iron oxide.

8. The process of claim 1, wherein the slurry of said magnetic iron oxide after coating of a cobalt compound or a cobalt compound and a ferrous compound is filtered and washed with water to form wet cakes and said wet cakes are dispersed in water to form a slurry to which is added a water-soluble compound of at least one metal selected from the group consisting of manganese, vanadium and zinc under a non-oxidizing atmosphere to effect coating of said compound on the particle surfaces of said magnetic iron oxide.

9. The process of claim 1, wherein coating of a compound of at least one metal selected from the group consisting of manganese, vanadium, and zinc is made in an alkali concentration range from an around neutral pH value to 2 mol/l of a free OH group concentration at a temperature of 10° to 60° C.

10. The process of claim 1, wherein coating of a compound of at least one metal selected from the group consisting of manganese, vanadium, and zinc is made in an alkali concentration range from an around neutral pH value to 2 mol/l of a free OH group concentration at a temperature of from 60° C. to the boiling point.

11. The process of claim 1, containing magnanese compound and wherein the manganese compound is coated in an amount of 0.5 to 5% by weight, calculated as Mn, based on said magnetic iron oxide.

12. The process of claim 1, containing vanadium compound and wherein the vanadium compound is coated in an amount of 0.1 to 2% by weight, calculated as V, based on said magnetic iron oxide.

13. The process of claim 1, containing zinc compound and wherein the zinc compound is coated in an amount of 0.5 to 5% by weight, calculated as Zn, based on said magnetic iron oxide.

14. The process of claim 1, wherein a heat treatment follows the step of coating of a compound of at least one metal selected from the group consisting of manganese, vanadium and zinc.

15. The process of claim 14, wherein the heat treatment comprises heating in the presence of water vapor at a temperature of 60° to 200° C.

16. A product obtained by the process of claim 1.
17. A product obtained by the process of claim 6.
18. A product obtained by the process of claim 7.
19. A product obtained by the process of claim 8.
20. A product obtained by the process of claim 14.
21. A process consisting essentially of the steps of claim 1.

* * * * *